United States Patent
Long

(10) Patent No.: US 8,534,153 B2
(45) Date of Patent: Sep. 17, 2013

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 236 days.

(21) Appl. No.: 13/109,197

(22) Filed: May 17, 2011

(65) Prior Publication Data

US 2012/0085191 A1   Apr. 12, 2012

(30) Foreign Application Priority Data

Oct. 11, 2010 (CN) .......................... 2010 1 0502749

(51) Int. Cl.
*B25J 17/00* (2006.01)

(52) U.S. Cl.
USPC .............................. 74/490.01; 901/15; 901/25

(58) Field of Classification Search
USPC .............. 74/490.01, 490.05, 490.06; 901/15, 901/23, 25, 28, 29, 30
See application file for complete search history.

(56) References Cited

U.S. PATENT DOCUMENTS

| | | | | |
|---|---|---|---|---|
| 4,499,790 A * | 2/1985 | Helms | ........................ | 74/665 C |
| 4,854,808 A * | 8/1989 | Bisiach | ........................ | 414/680 |
| 4,984,959 A * | 1/1991 | Kato | ........................ | 414/744.3 |
| 5,046,914 A * | 9/1991 | Holland et al. | ............... | 414/706 |
| 5,132,887 A * | 7/1992 | Torii et al. | ...................... | 362/259 |
| 5,249,479 A * | 10/1993 | Torii et al. | .................. | 74/479.01 |
| 5,456,132 A * | 10/1995 | Iwanaga et al. | ............ | 74/490.06 |
| 5,816,108 A * | 10/1998 | Obata et al. | ................. | 74/490.05 |
| 5,934,148 A * | 8/1999 | Haniya et al. | .............. | 74/490.06 |
| 6,014,909 A * | 1/2000 | Fiora | .......................... | 74/490.02 |
| 6,415,678 B1 * | 7/2002 | Nada | .......................... | 74/490.06 |
| 2011/0067514 A1* | 3/2011 | Long | .............................. | 74/420 |
| 2011/0232411 A1* | 9/2011 | Long | ............................. | 74/490.05 |
| 2011/0259137 A1* | 10/2011 | Long | ........................ | 74/490.05 |
| 2011/0265597 A1* | 11/2011 | Long | ........................ | 74/490.05 |
| 2012/0085191 A1* | 4/2012 | Long | ............................. | 74/423 |
| 2012/0103127 A1* | 5/2012 | Liu | ............................. | 74/490.06 |
| 2012/0160163 A1* | 6/2012 | Long | ............................. | 118/696 |
| 2012/0266712 A1* | 10/2012 | Oka et al. | .................. | 74/490.05 |
| 2012/0266720 A1* | 10/2012 | Oka et al. | .................... | 74/665 H |

* cited by examiner

*Primary Examiner* — David M Fenstermacher
(74) *Attorney, Agent, or Firm* — Altis Law Group, Inc.

(57) ABSTRACT

A robot arm assembly includes a first arm, a second arm; a first transmission assembly and a second transmission assembly. The first transmission assembly includes a first rotation shaft having a first bevel gear portion, a second rotation shaft having a second bevel gear portion engaging with the first bevel gear portion, and a third rotation shaft non-rotatably connected to the second rotation shaft. The second transmission assembly includes a forth rotation shaft and a fifth rotation shaft. The forth rotation shaft is rotatably sleeved on the first rotation shaft and includes a forth bevel gear potion. The fifth rotation shaft is rotatably sleeved on the second rotation shaft and includes a fifth bevel gear portion engaging with the forth bevel gear portion. An end of the fifth rotation shaft opposite to the fifth bevel gear portion is connected to the second arm.

15 Claims, 3 Drawing Sheets

ROBOT ARM ASSEMBLY

BACKGROUND

1. Technical Field

The present disclosure relates to an industrial robot, and more particularly, to a robot arm assembly of the industrial robot.

2. Description of Related Art

A commonly used industrial robot includes a plurality of arms rotatably connected to each other in order, thus, a movement of multiple axis is achieved. For example, a driving member is assembled between the first arm and the second arm to drive the second arm to rotate with respect to the first arm. Therefore, a number of driving members should be assembled between arms if the manipulator has many arms. Thus, the driving members are scattered between the arms of robot arm assembly. This result is the robot arm assembly is more complicated and space consuming.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
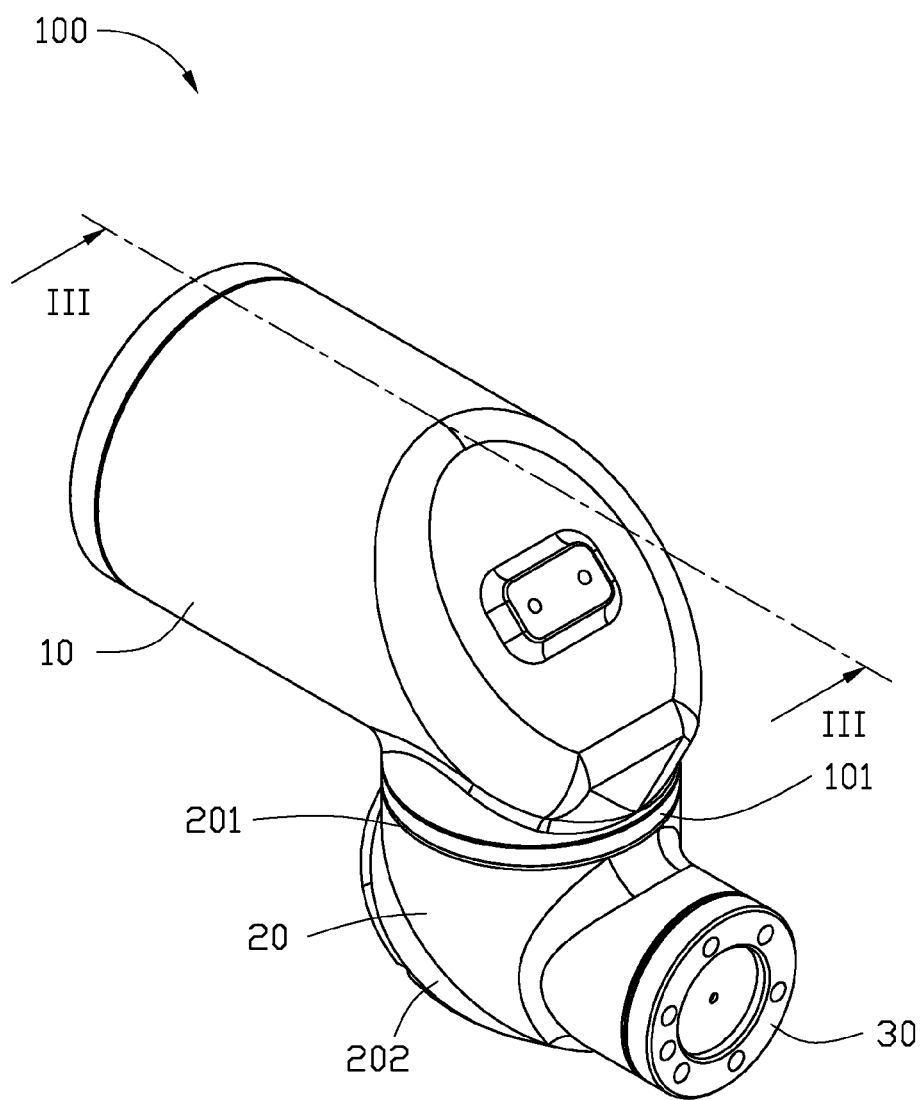
FIG. 1 is an isometric view of an embodiment of a robot arm assembly.
Figure 2:
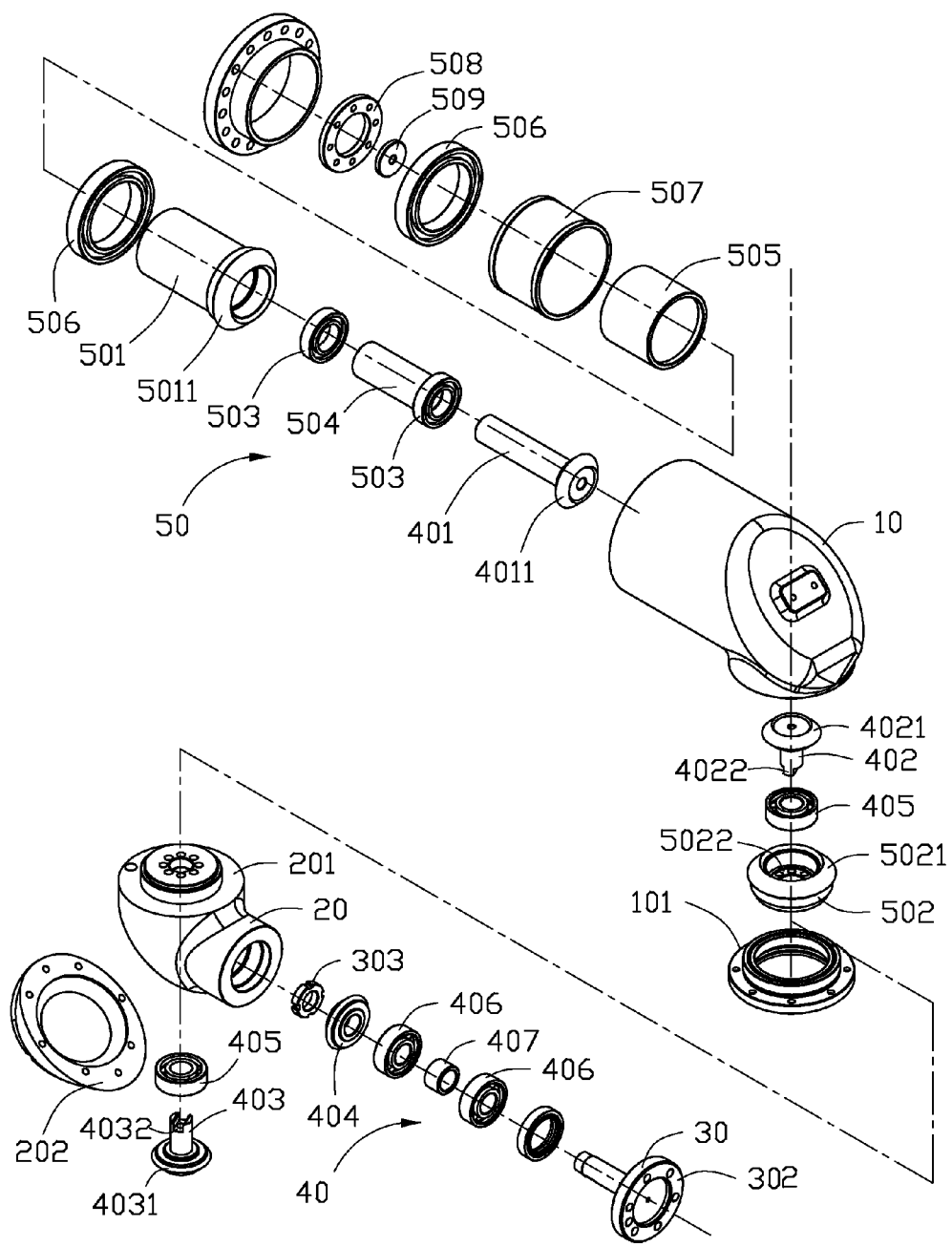
FIG. 2 is an exploded, isometric view of the robot arm assembly of FIG. 1.
Figure 3:
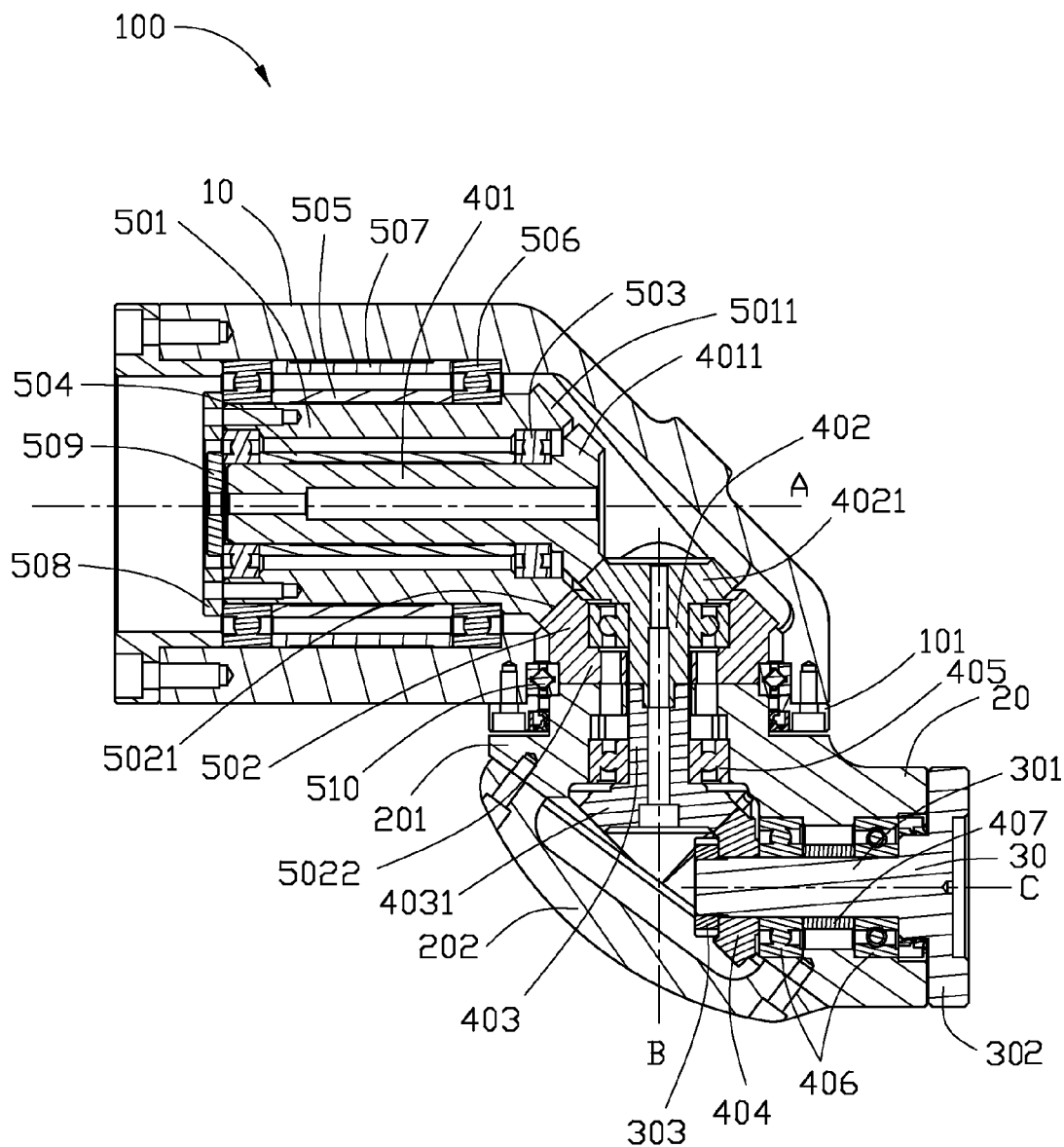
FIG. 3 is a cross-sectional view of the robot arm assembly of FIG. 1, taken along line III-III.

Referring to FIGS. 1 and 2, an embodiment of a robot arm assembly 100 used in six-axis industrial robot, includes a first arm 10, a second arm 20, a third arm 30, a first transmission assembly 40 coupled to the third arm 30, a second transmission assembly 50 coupled to the second arm 20. The first arm 10 is non-rotatably assembled with an end of the second arm, and the third arm 30 being rotatably assembled with the other end of the second arm 20, such that, the second arm 20 is assembled between the first arm 10 and the third arm 30. Referring to FIG. 3, the first arm 10, second arm 20 and third arm 30 are respectively configured to rotate along a first axis A, a second axis B and a third axis C of the six-axis robot. In the embodiment, the first axis A and the third axis C are substantially parallel, and substantially perpendicular to the second axis B.

The first arm 10 and the second arm 20 are hollow, crank-like structures and connect with each other at crank-like ends of the first and second arms 10, 20. The first arm 10 and the second arm 20 cooperatively form a hollow stepped shaft. The first transmission assembly 40 and the second transmission assembly 50 are received inside of the hollow stepped shaft.

A linking seal 101 is located at the ends of the first arm 10 and the second arm 20 jointed together. The linking seal 101 is annular-shaped. The second arm 20 includes a shoulder portion 201 abutting the first arm 10. A cover 202 detachably covers the second arm 20 adjacent to the shoulder potion 201. The linking seal 101 rotatably sleeves the shoulder portion 201 to enable the second arm 20 to rotate relative to the first arm 10.

The third arm 30 includes a shaft 301 and a flange 302 at one end of the shaft 301 resisting the second arm 20. The other end of the shaft 301 extends through the second arm 20. The flange 302 is used for fixing clamps or knives.

Referring to FIG. 3, the first transmission assembly 40 includes a first rotation shaft 401, a second rotation shaft 402, a third rotation shaft 403 and a bevel gear 404. The third rotation shaft 403 is substantially coaxial to the second rotation shaft 402 and perpendicular to the first rotation shaft 401. The central axis of the bevel gear 404 is perpendicular to the central axis of the third rotation shaft 403. The first rotation shaft 401 includes a first bevel gear portion 4011 at one end. The second rotation shaft 402 includes a second bevel gear portion 4021 at one end. The second bevel gear portion 4021 engages with the first bevel gear portion 4011 to enable the second rotation shaft 402 to connect with the first rotation shaft 401. The third rotation shaft 403 includes a third bevel gear portion 4031 at the distal end away from the second rotation shaft 402. The bevel gear 404 fittingly sleeves on the third arm 30, and engages with the third bevel gear portion 4031. The third arm 30 further includes a fixing member 303 fixedly sleeved on the end of the shaft 301 away from the flange 302. The fixing member 303 resists the bevel gear 404 to prevent the bevel gear 404 detaching from the third arm 30.

In the embodiment, the first rotation shaft 401, the second rotation shaft 402 and the third rotation shaft 403 are shaped in the form of hollow cylinder. The first, second and third bevel gear portions 4011, 4021, 4031 can be integrally formed with the corresponding first second and third rotation shafts 401, 402, 403 or fixed to the corresponding first second and third rotation shafts 401, 402, 403 directly. A central axis of the bevel gear 404 is coaxial to the third axis C. The second rotation shaft 402 includes a protrusion portion 4022 at the end away from the second bevel gear portion 4021. The third rotation shaft 403 defines a groove 4032 at the end opposite to the third bevel gear portion 4031. The protrusion portion 4022 engages with the groove 4032 to fix the third rotation shaft 403 to the second rotation shaft 402. The protrusion portion 4022 and the groove 4032 are adjacent to the ends of the first and the second arm 10, 20 jointed together. Furthermore, the third rotation shaft 403 can be fixed to the second rotation shaft 402 more firmly with fixing members such as pins received within the third rotation shaft 403.

The first transmission assembly 40 further includes a pair of bearings 405, a pair of bearings 406 and a first sleeve 407. The pair of bearings 405 sleeve on the outer surfaces of the second rotation shaft 402 and the third rotation shaft 403 respectively. The pair of bearings 406 sleeve on outer surface of the third arm 30. The pair of bearings 406 abut against the bevel gear 404 and the flange 302 respectively. The first sleeve 407 sleeves on the third arm 30 and is resisted between the pair of bearings 406.

The second transmission assembly 50 received within the first arm 10 includes a forth rotation shaft 501 and a fifth rotation shaft 502. In the embodiment, the forth rotation shaft 501 is a hollow shaft and includes a forth bevel gear portion 5011 at one end. The fifth rotation shaft 502 is a hollow shaft and includes a fifth bevel gear portion 5021 at one end. An annular portion 5022 forms on the inner surface at the other end of the fifth rotation shaft 501. The forth bevel gear portion 5011 and fifth bevel gear portion 5021 can be integrally formed with the forth shaft 501 and the fifth shaft 502 respectively or fixed to the forth shaft 501 and the fifth shaft 502 by linking members. The forth rotation shaft 501 is coaxial to the first axis A, the fifth shaft 502 is coaxial to the second axis B. The forth rotation shaft 501 connects with the fifth rotation shaft 502 by engaging the forth bevel gear portion 5011 and the fifth bevel gear portion 5021.

The forth rotation shaft 501 sleeves on the first rotation shaft 401 and the first bevel gear portion 4011 is exposed at a side of the forth rotation shaft 501. The fifth rotation shaft 502 sleeves on the second rotation shaft 402 and the second bevel gear portion 4021 is exposed at a side of the fifth rotation shaft 502.

The second transmission assembly 50 further includes a pair of bearings 503, a second sleeve 504, a third sleeve 505, a pair of bearings 506, a forth sleeve 507, a first washer 508, and a second washer 509. The pair of bearings 503 are positioned between the forth rotation shaft 501 and the first rotation shaft 401. The pair of bearing 503 sleeves on the two ends of the first rotation shaft 401 respectively. The second sleeve 504 sleeves on the first rotation shaft 401 and is resisted between the pair of bearings 503. The third sleeve 505 tightly sleeves on the forth rotation shaft 501. The pair of bearings 506 is positioned at the two ends of the third sleeve 505. The forth sleeve 507 is positioned on the inner surface of the first arm 10 corresponding to the third sleeve 503. Each of the two ends of the third sleeve 505 and the forth sleeve 507 resist between the pair of bearings 506. The first washer 508 is mounted at one end of the forth rotation shaft 501 away from the second rotation shaft 402. The second washer 509 is mounted at one end of the first rotation shaft 401 away from the second rotation shaft 402. The first washer 508 resists one of the bearings 506, as well as resisting one of the bearings 503 together with the second washer 509.

A cross roller bearing 510 is positioned at an end of the first arm 10. The second arm 20 rotatably connects the first arm 10 via the cross roller bearing 510.

The robot arm assembly 100 further includes a driving assembly (not shown) fixed at the end of the first arm 10 away from the second arm 20. The driving assembly includes a first driving member (not shown), a second driving member (not shown), and a third driving member (not shown). The first driving member connects the first arm 10 to drive the first arm 10. The second driving member connects the first rotation shaft 401 to drive the first rotation shaft 401. The third driving member connects the forth rotation shaft 501 to drive the forth rotation shaft 501.

When the first arm 10 is driven by the first driving member to rotate relative to the first axis A, the second arm 20, the third arm 30, the first transmission assembly 40 and the second transmission assembly 50 are then driven to rotate at a same time. As the forth rotation shaft 501 is driven by the third driving member to rotate relative to the first axis A, the fifth rotation shaft 502 engaging with the forth rotation shaft 501 is then driven to rotate relative to the second axis B. Furthermore, the second arm 20 secured to the fifth rotation shaft 502 is driven to rotate relative to the second axis B together with the first rotation assembly 40. As the first rotation shaft 401 is driven by the second driving member to rotate relative to the first axis A, the second rotation shaft 402 engaging with the first rotation shaft 401 is then driven to rotate relative to the second axis B. The third rotation shaft 403 fixed to the second rotation shaft 402. The third rotation shaft 403 rotates relative to the second axis B. The third arm 30 is then driven to rotate with the bevel gear 404 secured to the third rotation shaft 403, such that the flange 302 formed on the third arm 30 drive clamps or knives thereon rotate. Because the first rotation shaft 401, the forth rotation shaft 501 are received within the first arm 10 at the same end, the driving members can be mounted, this results in the robot arm assembly 100 being assembled more easily, saving space and being compact.

In the embodiment, the two pairs of bearings 405, 406 are deep groove ball bearings, they are also can be substituted by angular contact ball bearings.

In the embodiment, the second rotation shaft 402 connects with the third rotation shaft 403 and is strengthened by pins, they also can be secured non-rotatably by spline structure.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robot arm assembly, comprising:
   a first arm;
   a second arm connected to the first arm;
   a third arm extending through the second arm;
   a first transmission assembly received within the first and the second arms;
   a second transmission assembly received within the first and the second arms;
   the first transmission assembly comprising: a first rotation shaft comprising a first bevel gear portion; a second rotation shaft comprising a second bevel gear portion engaging with the first bevel gear portion, the second rotation shaft being substantially perpendicular to the first rotation shaft; a third rotation shaft non-rotatably connected to the second rotation shaft coaxially, the third rotation shaft comprising a third bevel gear portion distal from the second rotation shaft; and a bevel gear non-rotatably sleeved on the third arm and engaging with the third bevel gear portion;
   the second transmission assembly comprising a forth rotation shaft and a fifth rotation shaft, wherein the forth rotation shaft is rotatably sleeved on the first rotation shaft and comprises a forth bevel gear potion, the fifth rotation shaft is rotatably sleeved on the second rotation shaft and comprises a fifth bevel gear portion engaging with the forth bevel gear portion, an end of the fifth rotation shaft opposite to the fifth bevel gear portion connected to the second arm fittingly; and
   a cover detachably covering a part of the second arm where the third bevel gear portion is engaged with the bevel gear.

2. The robot arm assembly of claim 1, wherein the robot arm assembly further comprises a driving assembly positioned at an end of the first arm distal from the second arm, the driving assembly comprising a first driving member connected to the first arm; a second driving member is connected to the first rotation shaft, and a third driving member is connected to the forth rotation shaft.

3. The robot arm assembly of claim 1, wherein the third arm comprises a shaft and a flange formed on one end of the shaft to resist the second arm, the other end of the shaft extends through the second arm.

4. The robot arm assembly of claim 1, wherein the second rotation shaft comprises a protrusion portion formed at the end opposite to the second bevel gear potion, the third rotation shaft defines a groove at the end distal from the third bevel gear potion, the protrusion portion engages with the groove to enable the third rotation shaft connected with the second rotation shaft fittingly.

5. The robot arm assembly of claim 1, wherein the first, second, third, forth and fifth rotation shafts are hollow structures, the first bevel gear portion is exposed at a side of the forth rotation shaft, and the second bevel gear portion is exposed at a side of the fifth rotation shaft.

6. The robot arm assembly of claim 1 wherein the forth rotation shaft is rotatably sleeved on the first rotation shaft via a pair bearings, and the fifth rotation shaft is rotatably sleeved on the second rotation shaft via a pair of bearings.

7. A robot arm assembly, comprising:
a first arm;
a second arm connected to an end of the first arm;
a third arm extending through the second arm;
a first transmission assembly received within the first and the second arms, comprising: a first rotation shaft; a second rotation shaft comprising a protrusion portion, a third rotation shaft defining a groove, and a bevel gear sleeved on the third arm fittingly, the first rotation shaft, the second rotation shaft, the third rotation shaft and the third arm being engaged in turn; the protrusion portion engaged with the groove to fix the third rotation shaft to the second rotation shaft, the protrusion portion and the groove being settled adjacent to the ends of the first and the second arms jointing together, the third rotation shaft comprising a third bevel gear portion engaging with the bevel gear;
a second transmission assembly comprising: a forth rotation shaft sleeved on the first rotation shaft rotatably; a fifth rotation shaft sleeved on the second rotation shaft rotatably, the fifth rotation shaft is engaged with the forth rotation shaft; an end of the fifth rotation shaft distal from the forth rotation shaft is connected to the second arm fittingly; and
a cover detachably covering a part of the second arm where the third bevel gear portion is engaged with the bevel gear.

8. The robot arm assembly of claim 7, wherein the first arm is coaxial to a first axis, the second arm is coaxial to a second axis, the third arm is coaxial to a third axis, the third axis is parallel to the first axis and perpendicular to the second axis.

9. The robot arm assembly of claim 7, wherein the robot arm assembly further comprises a driving assembly positioned at an end of the first arm distal from the second arm, the driving assembly comprising a first driving member connected to the first arm, a second driving member connected to the first rotation shaft, a third driving member connected to the forth rotation shaft.

10. The robot arm assembly of claim 7, wherein the second arm comprises a shoulder portion abutting the first arm, the first arm comprises a linking seat, and the linking seat rotatably sleeves on the shoulder portion to enable the second arm rotate relative to the first arm.

11. The robot arm assembly of claim 7, wherein the first rotation shaft comprises a first bevel gear portion, the second rotation shaft comprises a second bevel gear portion, the second bevel gear portion engages with the first bevel gear portion to enable the second rotation shaft connect with the first rotation shaft.

12. The robot arm assembly of claim 7, wherein the forth rotation shaft comprises a forth bevel gear portion; the fifth rotation shaft comprises a fifth bevel gear portion, the fifth bevel gear portion engages with the forth bevel gear portion to enable the fifth rotation shaft connect with the forth rotation shaft.

13. The robot arm assembly of claim 7, wherein the first, second, third, forth and fifth rotation shafts are hollow structures, the first bevel gear portion is exposed at a side of the forth rotation shaft, the second bevel gear portion is exposed at a side of the fifth rotation shaft.

14. The robot arm assembly of claim 7, wherein the forth rotation shaft is rotatably sleeved on the first rotation shaft via a pair of bearings, the fifth rotation shaft is rotatably sleeved on the second rotation shaft via a pair of bearings.

15. The robot arm assembly of claim 7, wherein the second transmission assembly further includes a cross roller bearing positioned at an end of the first arm, the second arm rotatably connects with the first arm via the cross roller bearing.

* * * * *